United States Patent [19]

Gournay

[11] 4,399,693
[45] Aug. 23, 1983

[54] APPLICATIONS OF BOREHOLE GRAVIMETRIC TECHNIQUES TO DETERMINE RESIDUAL OIL SATURATION

[75] Inventor: Luke S. Gournay, Rockwall, Tex.

[73] Assignee: Mobil Oil Corporation, New York, N.Y.

[21] Appl. No.: 338,400

[22] Filed: Jan. 8, 1982

[51] Int. Cl.³ .............................................. G01V 1/40
[52] U.S. Cl. .................................... 73/152; 73/382 R
[58] Field of Search .................. 73/382 R, 382 G, 152

[56] References Cited

U.S. PATENT DOCUMENTS

| 2,570,659 | 10/1951 | Fay et al. | 73/382 |
| 3,060,371 | 10/1962 | Townsend et al. | 73/152 |
| 3,472,076 | 10/1969 | Howell et al. | 73/382 |
| 3,717,036 | 2/1973 | La Coste | 73/382 |
| 3,878,890 | 4/1975 | Fertl et al. | 73/152 |
| 4,245,313 | 1/1981 | Coates | 73/152 |

Primary Examiner—Howard A. Birmiel
Attorney, Agent, or Firm—Charles A. Huggett; Michael C. Gilman; George W. Hager

[57] ABSTRACT

A method for borehole gravimetric determination of residual oil saturation of a formation is described. In a preferred embodiment plural measurements of the local gravity are taken at each of spaced locations within a well and those departing more than a statistically determined distance from the mean of the measurements taken at a given location are deemed to be in error and are not used in calculation of the density of the formation at a given point.

5 Claims, 10 Drawing Figures

APPLICATIONS OF BOREHOLE GRAVIMETRIC TECHNIQUES TO DETERMINE RESIDUAL OIL SATURATION

FIELD OF THE INVENTION

This invention relates to improved methods for determining the amount of residual oil remaining in a formation after previous production operations have been carried out. More particularly, the invention relates to the use of borehole gravimetric methods for measuring the amount of residual oil remaining in previously produced formations.

BACKGROUND OF THE INVENTION

The increasing need for hydrocarbons, particularly from regions of political stability, has led to reevalution of the desirability of recovery of residual oil left in formations previously worked. Thus, oil fields having had a first production run using conventional production techniques, having later had a secondary production using more sophisticated production techniques, are now being considered for third generation or tertiary recovery methods. These methods are naturally more expensive than the primary and secondary methods mentioned. Accordingly, it is desirable to determine the amount of residual oil left in a given field as precisely as possible so that an accurate determination of whether or not it would be economically feasible to perform tertiary recovery techniques can be made. Furthermore, the amount of residual oil is also relevant to selection of a particular tertiary oil recovery method.

In 1978, the Interstate Oil Compact Commission (IOCC) of Oklahoma City, Okla., published a volume entitled "Determination of Residual Oil Saturation" in which were tabulated the various methods of determination of residual oil saturation. The Commission concluded at page 289 that, "Even if all necessary precautions are observed in the design and conduct of tests to determine residual oil saturation, it should be recognized that there are large areal variations in oil saturations remaining in reservoirs that are substantially depleted by water flood or water drive".

Accordingly, there remains a need in the art for an accurate method of determining residual oil saturation. In order to be practicable the method must be capable of performance at reasonable cost. Furthermore, such a method would desirably measure residual oil saturation in regions beyond the immediate vicinity of the borehole. By comparison, many of the methods considered by the IOCC were only capable of determining residual oil saturation within 12 to 18 inches of the borehole wall. Another disadvantage of several of the methods considered by the IOCC were that the methods were only applicable when the hole was uncased, i.e., had not had a steel casing inserted therein. Many useful wells have such casings and it is therefore desirable that any method of determining residual oil saturation be operable in such cased wells.

OBJECTS OF THE INVENTION

It is therefore a primary object of the invention to provide a method whereby residual oil saturation can be accurately determined.

A further object of the invention is to provide a cost effective method whereby residual oil saturation can be determined.

A further object of the invention is to provide a method for determining which of a plurality of possible wells for performance of tertiary oil recovery methods are likely to yield the best results.

A further object of the invention is to provide a method for determining residual oil saturation which can be used in both cased and uncased wells.

Still a further object of the invention is to provide a method of determining residual oil saturation which provides results indicative of conditions existing a substantial distance from the center of the well.

SUMMARY OF THE INVENTION

The above mentioned needs of the art and objects of the invention are satisfied by the present invention which comprises a method for measuring oil saturation using borehole gravimetric techniques. Reliable borehole gravimetric techniques have recently been developed and provide an indication of the bulk density of rock up to fifty feet or more from the well bore of the hole being logged. If accurate measurements of porosity of the formation are available, the residual oil saturation can be calculated to a high degree of accuracy.

While the gravimetric technique is highly accurate and can yield results of good resolution, it is susceptible to inaccuracies caused by, e.g., careless measurement techniques, signal noise and the like. Accordingly, in the preferred embodiment of the invention, plural measurements are taken at each location and smoothing techniques are applied to the result so as to eliminate readings which are likely to be inaccurate.

BRIEF DESCRIPTION OF THE DRAWINGS

The invention will be better understood if reference is made to the accompanying drawings, in which.

DESCRIPTION OF THE PREFERRED EMBODIMENTS

As mentioned above, borehole gravimetry has by now devloped into a reasonably reliable tool for oil well logging. Gravimetric logging services are now commercially available; the present application is based on work done by Exploration Data Consultants (EDCON) of Denver, Colo. using a gravity meter of the type devised by LaCoste and Romberg.

Figure 1:
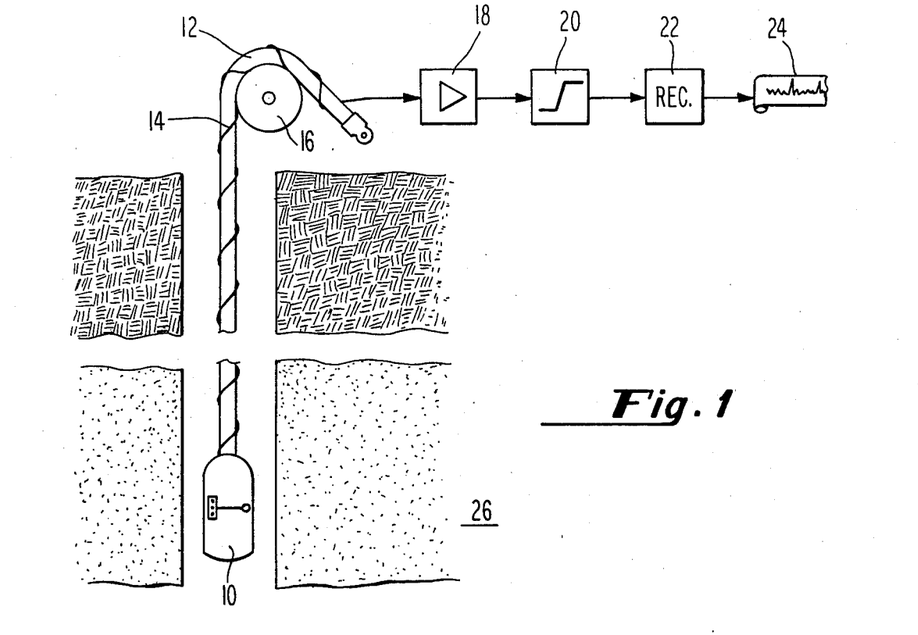
FIG. 1 shows an overall view of the gravimetric measuring technique.
Figure 2:
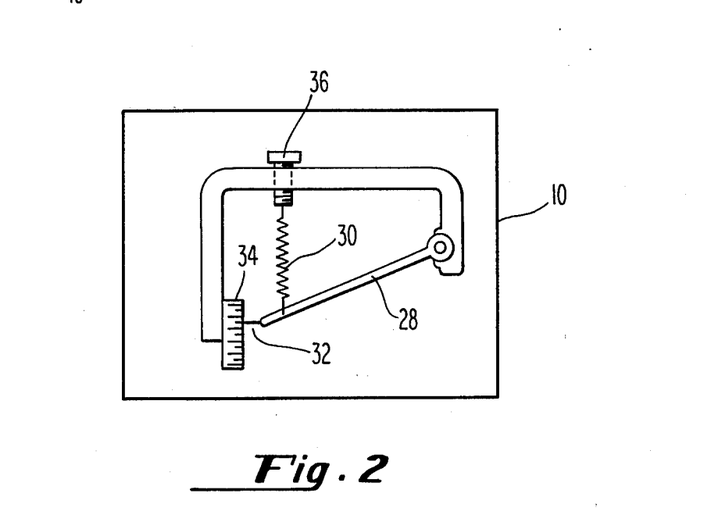
FIG. 2 shows a schematic depiction of the borehole gravimeter used.

The general arrangement of gravimetric exploration operations is shown in FIG. 1. The LaCoste and Romberg type gravity meter 10 which is explained generally in connection with FIG. 2 is passed down through a well extending from the surface of the earth down through formations of various types until the area of interest is reached. As discussed above, the technique of the invention is envisioned for use in determining which of a plurality of previously drilled wells are the best candidates for tertiary recovery. Accordingly, one would typically only log those areas from which oil had previously been recovered, so that in a well 9,000 feet deep, one might only log 200 to 300 feet of the total depth. The gravity meter 10 is lowered, by means of a cable 12 carrying a signal wire or wires 14 running over a sheave 16, to the depth of interest. Gravimetric measurements, yielding signals proportional to the density of the surrounding formation, are then made. The signals are amplified in an amplifier 18, filtered by filters 20, recorded on recorder 22 and a strip chart 24 produces a record for on-the-spot evaluation. The data recorded on recorder 22 may be interpreted to yield a result proportional to the bulk density $\rho_b$ of the formation 26 in the vicinity of measurement. According to the present invention, the residual oil saturation $S_o$ can be calculated once $\rho_b$ is determined, as $S_o$ depends only on $\rho_b$ and on the matrix density $\rho_{ma}$, the pore water density $\rho_w$, the pore oil density $\rho_o$, and the fractional porosity $\phi$, all of which are directly measurable quantities.

For example FIG. 2 shows a schematic depiction of the LaCoste and Romberg gravity meter; other types of gravity meters are within the scope of the present invention. A lever 28 is pivoted more or less against the bias of a spring 30 in accordance with the vertical component of the earth's gravity in its immediate locale. As noted above, this meter is capable of yielding results proportional to the density of the formation within a radius of about 100 feet of the borehole itself. A pointer 32 is affixed to the end of the pivoted lever 28 and indicates a point on a scale 34. The spring 30 is connected to a pre-load screw 36 which is moved in order to cause the lever pointer 32 to reach a predetermined index point on the scale 34. The amount of adjustment of the preload required to index the pointer 32 is proportional to local variations in gravity; thus the preload adjustment is effectively the data output by the gravity meter 10. The meter is sealed within an enclosed container before being passed down the hole.

As noted above, the gravity meter of FIG. 2 is of conventional design, its details forming no part of the present invention. Similarly, the operations shown schematically in FIG. 1 are presently commercially available from logging contractors and similarly form no part of the present invention. Instead, the present invention concerns use of borehole gravimetric techniques to determine residual oil determination in given formation.

The borehole gravity meter, as the name implies, simply measures the vertical component of the earth's gravitational acceleration at a desired depth in the borehole. Given measurements at two different depths, one obtains the gravitational gradient and can proceed to compute the formation bulk density $\rho_b$ from the following equation:

$$\rho_b = \frac{F - (\Delta g/\Delta Z)}{4 \pi G} \quad (1)$$

where
F is the free air gradient;
$\Delta g$ is the gravity difference between the two readings;
$\Delta Z$ is the vertical distance between gravity measurement stations; and
G is the universal gravitational constant.
Written in units of microgals (one gal = 1 cm/sec²) for $\Delta g$, gm/cc for $\rho_b$, and feet for $\Delta Z$, we have $$\rho_b = 3.687 - 0.039185 \Delta g/\Delta Z \quad (2)$$

The bulk density $\rho_b$ is representative of the horizontal slab of material that lies within $\Delta Z$; it is the accurate determination of $\rho_b$ by gravimetric techniques which makes the method of the invention feasible.

Some commending features of borehole gravimetric measurments are:

(a) they are unaffected by casing, fluid invasion, hole conditions or cement bond; and (b) the radius of investigation is considerably greater than that of other logging tools. As a general rule, the radius of investigation is 5 times the spacing between stations, $\Delta Z$. For example, formation bulk density over a radius of 100 feed is measured if $\Delta Z = 20$ feet.

The bulk density $\rho_b$ is a function of several factors:

$$\rho_b = (1-\phi)\rho_{ma} + (\rho_w S_w + \rho_o S_o)\phi \quad (3)$$

where
$\phi$ = fractional porosity
$\rho_{ma}$ = matrix density
$\rho_w$ = pore water density (in situ)
$S_w$ = fractional water saturation
$\rho_o$ = pore oil density (in situ)
$S_o$ = fractional oil saturation.

Letting $S_o = (1-S_w)$, we can rearrange and write water saturation as $$S_w = \frac{\rho_b - (1-\phi)\rho_{ma} - \rho_o \phi}{(\rho_w - \rho_o)\phi} \quad (4)$$

In most reservoirs, $\rho_{ma}$, $\rho_o$ and $\rho_w$ are known initially and during its production history.

If the porosity $\phi$ of the formation in the interval $\Delta Z$ is known well enough from suites of logs and core analysis, and if the bulk density $\rho_b$ is obtained from borehole gravimetric data according to the invention, then the water saturation $S_w$ can be derived from equation 4.

It will be appreciated by those skilled in the art that equation (4) is correct because porosity generally does not change during production operations. Rather oil is replaced by water in the pores of the rock. Thus, if one can determine $S_w$, one can determine the residual oil saturation $S_o$ from the relation $S_o = (1-S_w)$.

It will be appreciated by those skilled in the art that the accuracy of the technique of the invention is limited by the difference between the densities of the matrix, the oil and the water. In a typical formation of interest, the density of the rock is 2.65 grams per cc, that of water is 1 gram per cc, and that of oil typically 0.75 grams per cc. The bulk density of a typical formation of 25% porosity would be 2.3 grams per cc.

It will be appreciated by those skilled in the art that the difference in density between water and oil, particularly as a fraction of the total density, is relatively small. Accordingly, it is essential to get extremely accurate measurements of the various densities, including the porosity and in particular the bulk density $\rho_b$ if meaningful results are to be obtained.

The feasibility of this approach will therefore be determined largely by the accuracy with which $\rho_b$ can be determined using borehole gravimetric techniques; this in turn is dictated by the accuracy with which gravity can be measured. The accuracy required can be estimated by substituting the definition of $\rho_b$ from equation (2) for $\rho_b$ in equation (4) to obtain $$S_w = \frac{3.687 - .039185(\Delta g/\Delta Z) - (1-\phi)\rho_{ma} - \rho_o \phi}{(\rho_w - \rho_o)\phi} \quad (5)$$

Taking the partial derivative of $S_w$, we obtain $$\frac{\partial S_w}{\partial (\Delta g)} = \frac{-.039185}{(\rho_w - \rho_o) \phi (\Delta Z)} \quad (6)$$

For an example showing the sensitivity of measurement of $S_w$ as a function of error in measurement of $\Delta g$, assume 25% porosity, 1.0 gm/cc, and 0.64 gm/cc for water and oil density respectively, and $\Delta Z = 20$ feet. Table I shows some error values in $S_w$ for a given error in $\Delta g$.

TABLE I

| Error in $\Delta g$ (microgals) | Error in $S_w$ (percent pore volume) |
|---|---|
| 1 | 2.2 |
| 3 | 6.5 |
| 5 | 10.9 |
| 10 | 21.8 |

To meet the Interstate Oil Compact Commission's classification of "good to excellent" accuracy and to do so in one borehole gravimetric logging run would require a meter with a precision better than 4 or 5 microgals. That this is not possible with presently available techniques is demonstrated in FIG. 3, which is a histogram of the error distribution of 147 repeated gravity readings made under identical conditions in actual wells. The standard deviation of these errors is 8.3 $\mu$gal and some errors range as far as 26 $\mu$gal.

One means of improving the above situation is to oversample the interval of interest and apply some degree of filtering or smoothing to the data. Since the error distribution was known from the data in FIG. 3, computer modeling and simulation was used to determine the best method of oversampling and filtering.

The lower 180 feet (8500 to 8680 ft) of a well in the Brent sand of the Statfjord field were chosen as a real example to work with. Porosity and water saturation were obtained from log analysis. Values of matrix density, oil density, and water density of 2.69, 0.64 and 1.0 gm/cc respectively were used.

This 180-foot interval was subdivided into smaller units and a bulk density figure was computed for each unit using the data above. Gravity was then computed at equidistant stations through the entire interval. The result at this point is equivalent to the gravity values which would be observed with a real—though errorless—borehole gravimetric log. If these gravity versus depth results were substituted back into equation (5), the water and oil saturation could be directly calculated.

Figure 3:
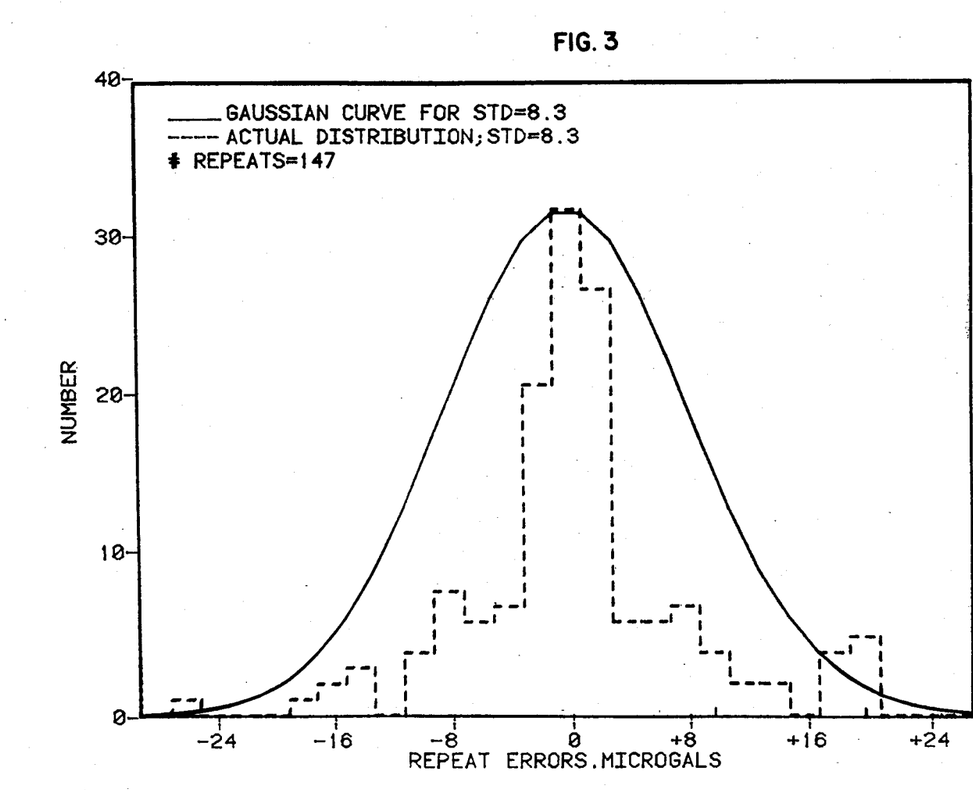
FIG. 3 shows the typical error function of the data.

Instead, for modeling purposes, errors are introduced into the computed gravity measurements, simulating measurement errors, and the calculation for $S_w$ is performed using equation (5). It would be inappropriate to simply generate normally distributed errors for this purpose, since as shown in FIG. 3 the observed distribution is not Gaussian. It was felt that the observed error distribution would be more representative of the real problem. Therefore, a random selection of an error value from the source group of 147 was made. This was arithmetically added to the first gravity reading and the resulting error value was removed from the source group. Next, another error value was selected and added to a second gravity reading, and that value was removed from the group. This was continued until all computed gravity readings had been distorted by an error. Of course, as shown in the distribution group of FIG. 3, many errors were zero. These error perturbed gravity readings were then smoothed by one of several means prior to computing $S_w$.

It will be appreciated that one has a choice of the method of oversampling. The selection is influenced by the cost of the log in practice. For example, 10,000 gravity readings would result in a very small error in $S_w$ but would be prohibitive in cost. For the present example, a conservative figure of approximately 100 readings over a 180 foot interval was chosen which would reduce the logging costs to a tolerable figure.

Given 90-100 readings one can go either of two routes: (a) sample a few stations many times and remove "obviously" bad readings, (b) sample more stations a lesser number of times and apply a form of smoothing to the entire ensemble. The results of both routes are presented separately.

For the example, the assumption is made that the reservoir has been produced such that the oil-water contact has risen 100 feet and that the contact is discontinuous. Capillary pressure functions could be added in a real situation. We also assume a uniform 30 percent residual oil saturation.

We first calculate results based on ten simulated gravity readings taken at stations separated from one another by 20 feet. At each station the data was examined and readings which had repeat errors greater than 12 $\mu$gal were rejected. The retained readings are graphed in FIG. 4 by the dotted line marked "BHGM $S_w$" (for "borehole gravity meter $S_w$"). The mean of the retained points was then used to compute $S_w$ using equation (5); the results are shown marked "actual $S_w$" in FIG. 4. In this and in subsequent figures, depth is referenced to the top of the interval examined, i.e., 8500 to 8680 feet.

Figure 4:
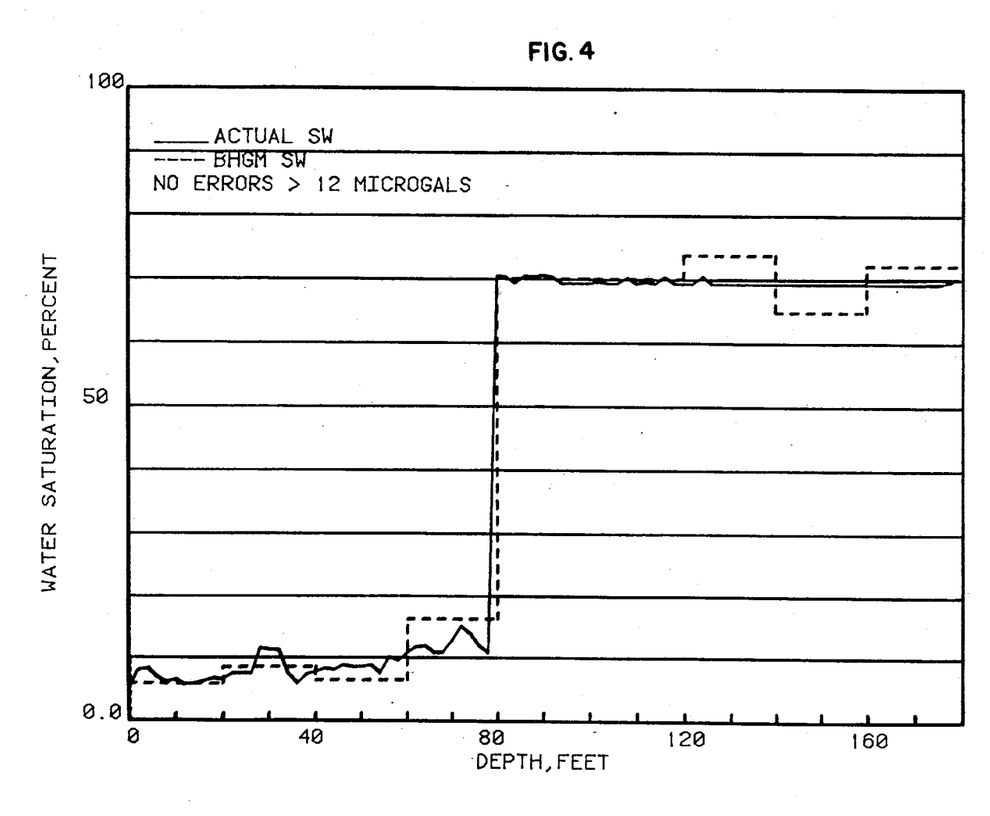
FIGS. 4 through 9 show computer modeled results of measurements performed using varied smoothing techniques.

The largest departure from the 70 percent $S_w$ line is between 140 and 160 feet but this departure is only five saturation percent. Averaged over the full 100 feet, the error in $S_w$ is two saturation percent. According to the Interstate Oil Compact Commission's classification, these results border between excellent and good. Again, however, it is emphasized that a good knowledge of porosity, e.g., from actual core samples, is a major prerequisite to these results.

Figure 5:
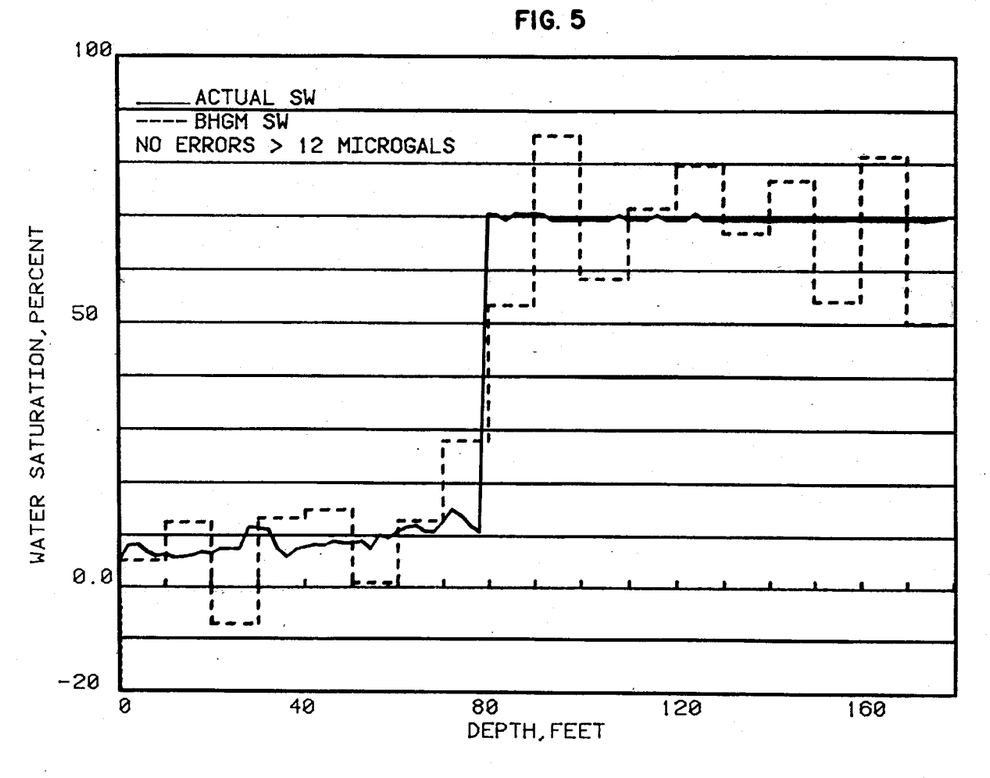

We now go through a similar procedure, based on five simulated readings each at stations separated by 10 feet. Again we reject any repeat error greater than 12 $\mu$gal. FIG. 5 shows the result and the corresponding data scatter due to fewer readings per station.

The objection could be made that rejecting gravity readings which depart from the mean by more than some arbitrary value is not objective. Consistency is observed to reduce any error thus caused. Furthermore, the following equation, which weights reading according to their closeness to the mean, is of use:

$$Y = \frac{\sum_i X_i \exp -\left(\frac{X_1 - \overline{X}}{a}\right)^n}{\sum_i \exp -\left(\frac{X_i - \overline{X}}{a}\right)^n} \quad (7)$$

Figure 6:
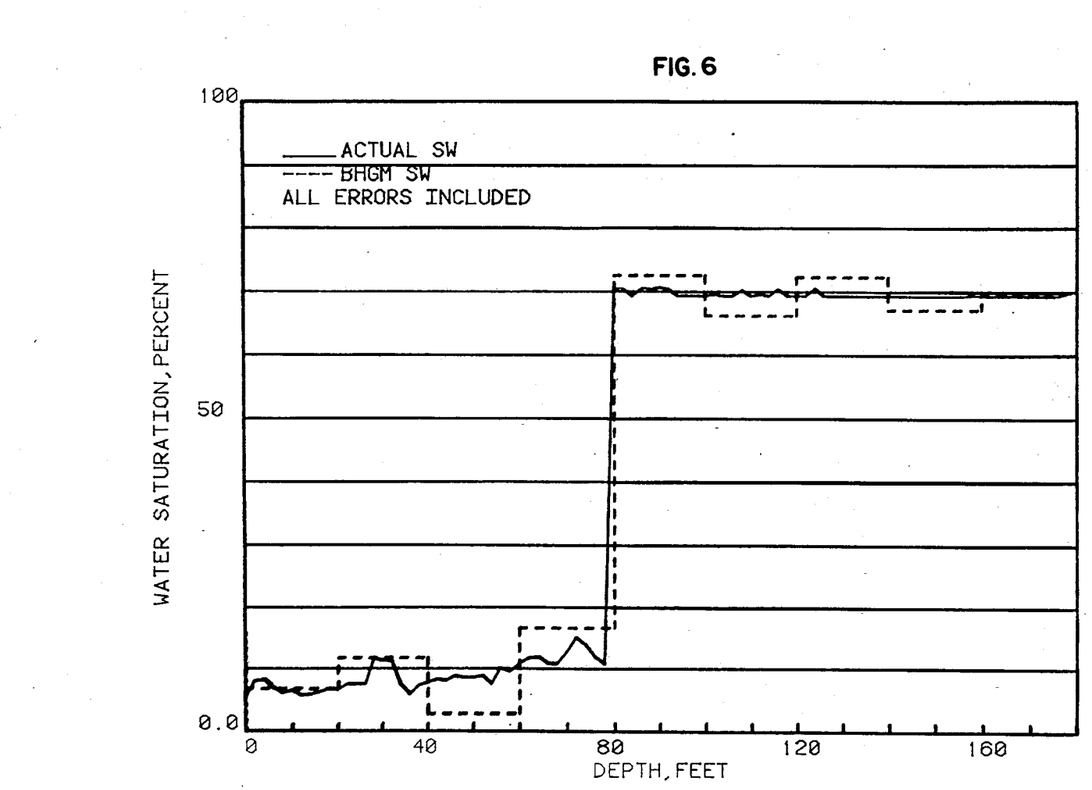
Figure 7:
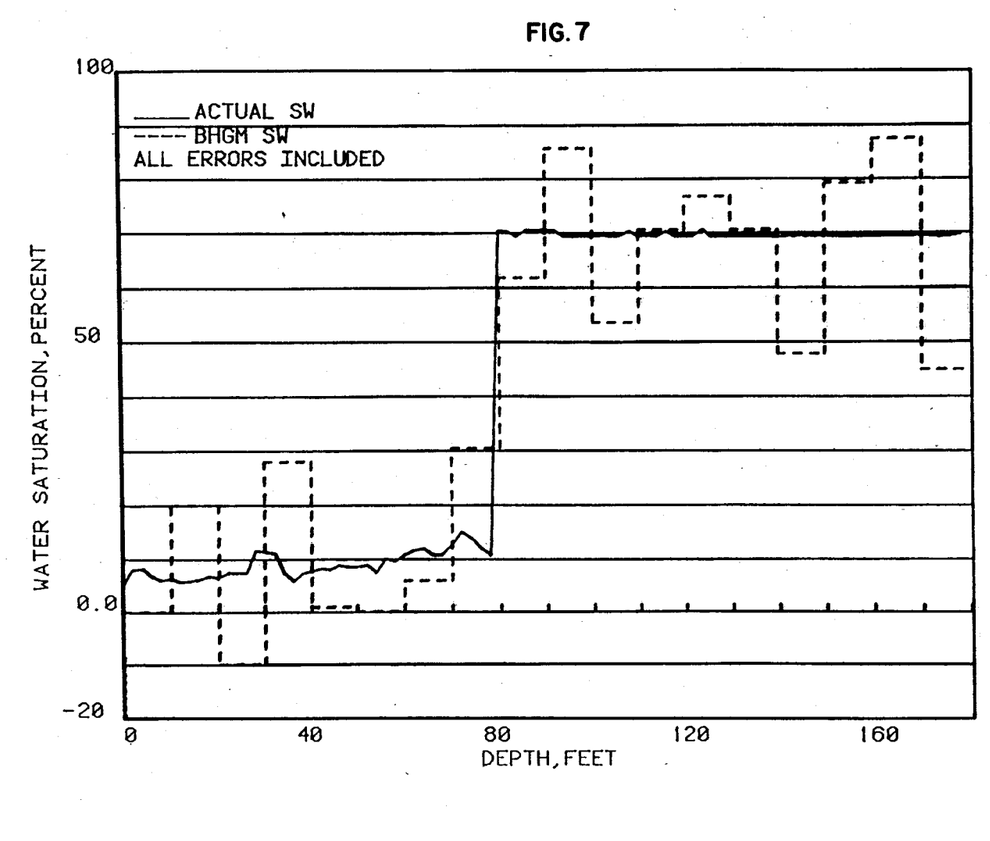

Here the $X_i$'s are the individual readings, $X$ is the mean of the group of readings at a station and $Y$ is the weighted resultant. FIG. 6 shows a plot of the data of FIG. 4 using the full error distribution and the exclusion property of equation (7). The values of n and a chosen, 10 and 8 respectively, were chosen to reduce the influence of by a highly deviant reading. Again, residual oil fluctuates ±4 saturation percent about the true value—an acceptable degree of error. Using Equation 7 again we looked at the example of 5 readings per station spaced 10 feet apart (as in FIG. 5); results are shown in FIG. 7 and are similar to those of FIG. 5, in showing the scatter due to reduced sampling rate.

Figure 8:
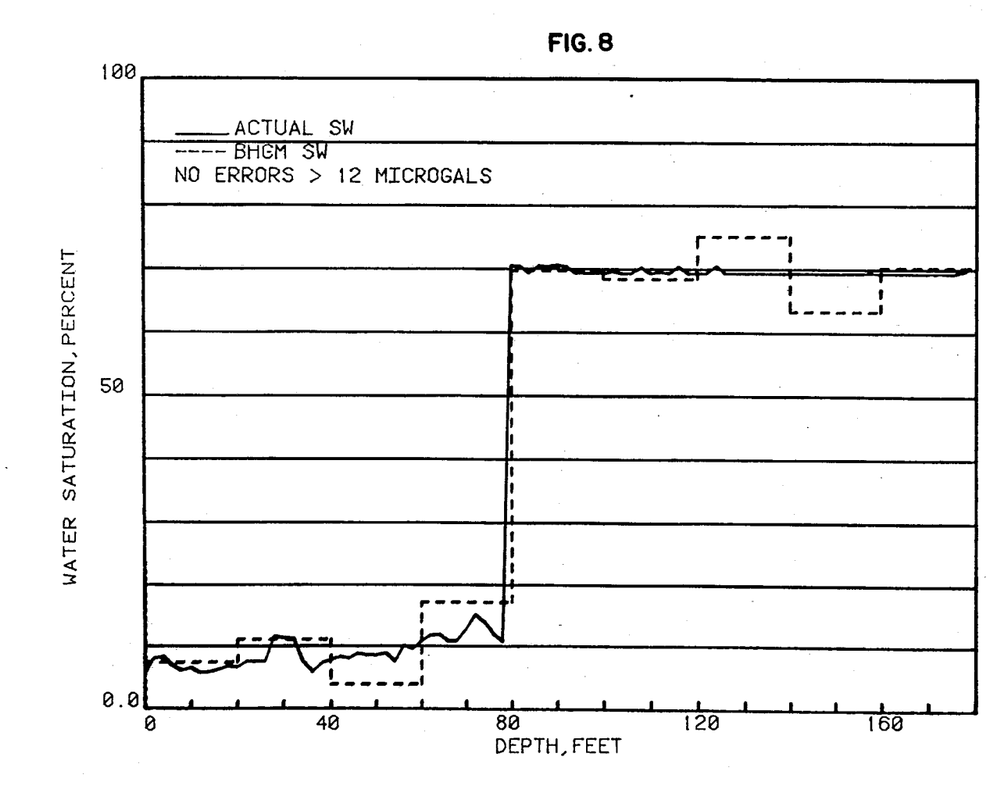
Figure 9:
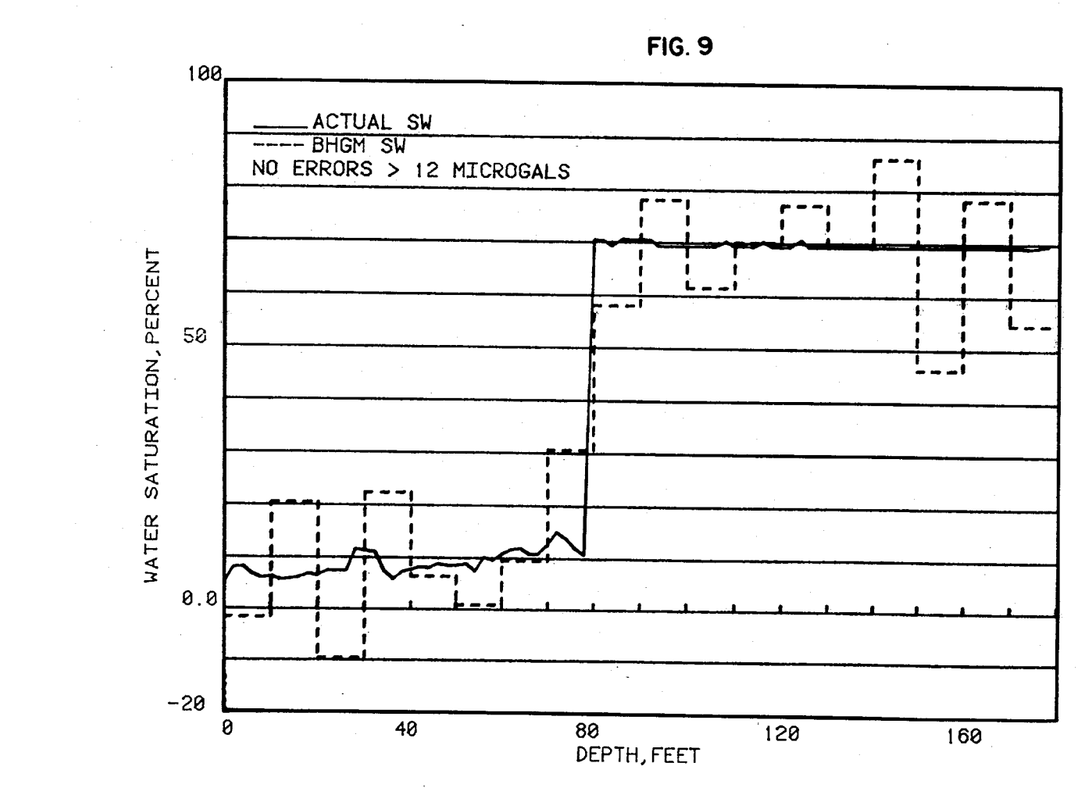

Finally, we applied both methods simultaneously; all errors greater than 12 μgal were rejected, and equation (7) was used. Results for 20 foot and 10 foot spacings with 10 and 5 readings, respectively, are shown in FIGS. 8 and 9.

Figure 10:
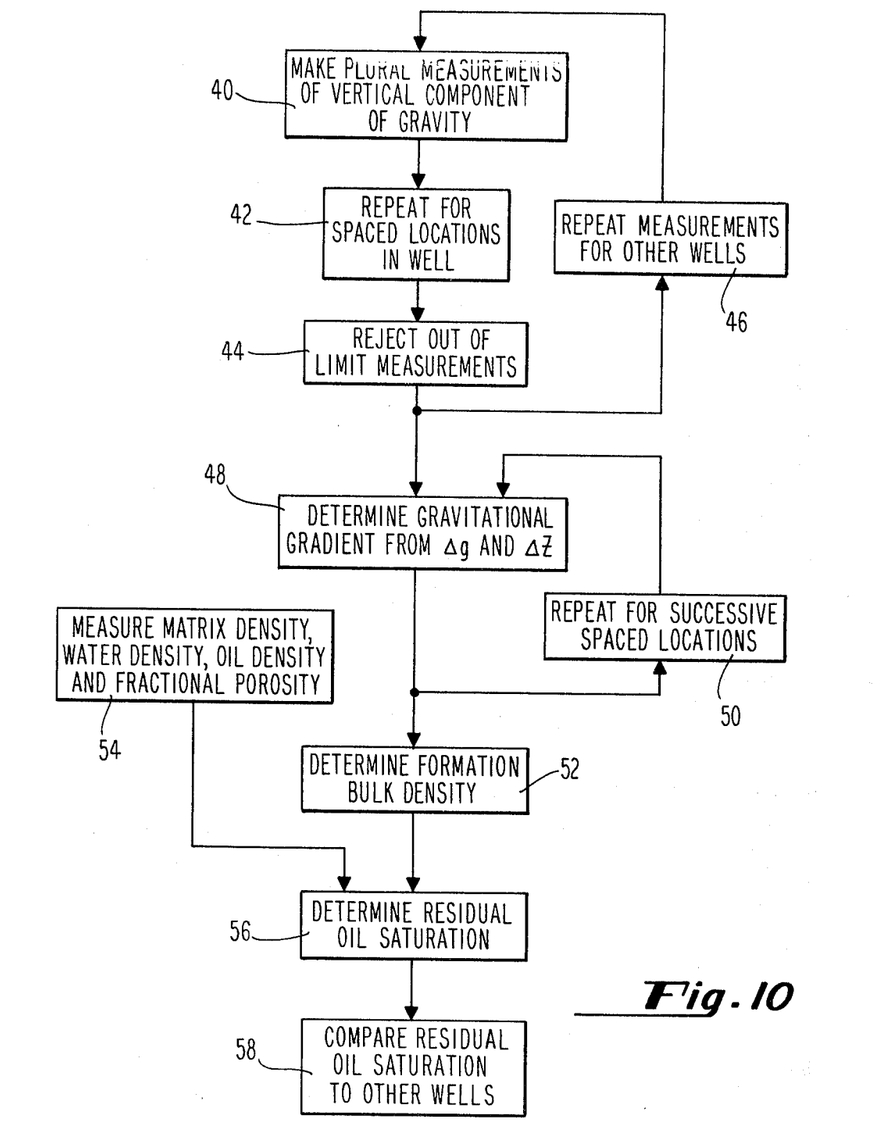
FIG. 10 shows a schematic flow chart and view of the process of the invention.

FIG. 10 shows in flow chart form, a schematic depiction the practice of the process of the invention. Plural measurements are made of the vertical component of the earth's gravity at locations within a borehole, e.g. as shown in FIG. 1, at 40. The measurements are repeated at spaced locations in the well, as at 42. The smoothing techniques discussed above are optionally employed as at 44, to reject out of limit measurements. Similarly, if a number of possible candidate wells for further oil recovery techniques are to be evaluated, the steps 40 to 44 are repeated for the other wells, as at 46. Finally, for each well, the gravitational gradient Δg is determined from the variation in gravity between the spaced locations in each well, and as a function of their spacing Δz, as at 48. This is repeated for each of the spaced locations, as at 50. The formation bulk density can then be determined for each of the wells considered as at 52. Measurements are made of the matrix density, water density, oil density and fractional porosity measurements, either during prior production operations, or at the time of practice of the process of the present invention, as at 54. The residual oil saturation for each well can then be directly determined from Equation 4, at 56, and the comparison can be made between the residual oil density results for each well, so that those which are the best candidates for further recovery techniques can be identified.

Those skilled in the art will recognize by examination of the above mathematical derivation and of the accompanying Figures that borehole gravimetric methods have been shown to be useful for satisfactory determination of residual oil saturation. Results are improved if at least 10 gravity measurements are carried out at each station; as noted, the matrix porosity and the densities of the matrix, of the oil involved and of water must be known to high accuracy.

Those skilled in the art will also recognize that there are other ways in which the delicacy and subtlety of the gravimetric methods could be accomodated other than by performance of multiple measurements at each station and discarding those departing more than a certain degree from the mean of the distribution as described above. The present applicant has performed comparable simulations of numerous other methods and has concluded that that described above is the best mode of practicing his invention. One possibility is to perform single gravimetric samples at many stations and use the well understood "Bouguer anomaly" method of finding the interface between the water and oil. However, the filtering employed for convolution in such a procedure includes a low pass filter which mutilates some of the detail of the Bouguer anomaly data. Other filtering techniques can also be employed, for example, using moving average filters on the Bouguer anomaly data while averaging $S_w$ over some depth interval. In some circumstances this method may be useful in location of the oil and water contact.

Attempts were also made to smooth the gravity curve by fitting it to a polynomial. This did not appear to be particularly useful. Similarly, low pass filtering by selecting a cut-off wave number in the power spectrum of the Bouguer Anomoly and suppressing signal power above the cutoff was also tried but was not successful. A final method tried involved "Wild Point" editing, whereby the points from the curve most deviant from the mean are first removed. The mean is then recomputed, the points now most deviant are removed, and so on. Again, the results were not superior to those methods described in detail above.

A final point to be mentioned is that calculation of the partial derivative of $S_w$ with respect to porosity indicates that a 1 percent porosity error can generate a 12 percent saturation error. While laboratory porosity measurements are usually good to approximately 0.1 porosity percent, so that good core data could reduce error in $S_w$ as calculated using the methods of the invention, to less than 2 saturation percent, it is important once again to emphasize that porosity must be known in order that the methods described above and claimed below can give good results.

Those skilled in the art will recognize that by performing the method of the invention on a plurality of wells considered as possible candidates for tertiary recovery techniques, the evaluation of the candidate wells to yield the best selection(s) for such techniques can be made. In particular, the residual oil saturation of a particular formation surrounding a particular well, derived in accordance with the invention, may be used in conjunction with the prior production history of the well, indicating the extent of the field examined, to make an intelligent determination of which of a plurality of previously worked wells are the best candidate(s) for further recovery techniques.

While a preferred embodiment of the invention has been shown and described, this should not be deemed as a limitation on the scope of the invention, but as illustrative only; the scope of the invention is more properly defined by the following claims.

What is claimed is:

1. A method of determining residual oil saturation of an oil bearing formation comprising:
   traversing a borehole with a gravimetric logging tool;
   mesuring the earth's gravity at spaced locations in said borehole;
   determining the gravitational gradient of the formation by comparison of said measurements of the earth's gravity at successive ones of said locations;
   determining the formation bulk density from the variation in the gravitational gradient at said successively spaced locations and from the vertical distance between the successive spaced locations;
   measuring the matrix density, water density, oil density, and fractional porosity of the formation; and
   determining the residual oil saturation from the previously determined bulk density and from the measured matrix density, water density, oil density and fractional porosity.

2. The method of claim 1 wherein said step of measuring the earth's gravity comprises the steps of:
   repeatedly measuring the earth's gravity at each said location; and
   rejecting the measurements of gravity departing by more than a statistically determined amount from the mean of said measurements made at each location.

3. A method of determining which of a plurality of previously worked wells in oil bearing formations are likely candidates for further development by determination of residual oil saturation of the formations, comprising the steps of:

performing borehole gravimetric logging operations on each of said wells, said operations comprising the steps of measuring the vertical component of the earth's gravity at spaced locations within each well known to be in the vicinity of oil bearing formations, so as to determine the bulk density of said formation, and calculating the water saturation from said bulk density and previously determined values of the matrix density, the water density, the oil density and the fractional porosity of the formation;

determining the residual oil saturation from the water saturation; and comparing the residual oil saturation from each well with that determined with respect to other of said wells whereby to determine which wells have the highest residual oil saturation and are therefore best candidates for further development.

4. The method of claim 3 wherein plural gravimetric measurements are taken at each of said spaced locations within said wells.

5. The method of claim 4 wherein said plural measurements taken at each of said predetermined spaced locations with each well are examined and those departing from the mean of said measurements taken at each predetermined location by more than a specified amount are not used in the calculation of the bulk density at that location.

* * * * *